Aug. 22, 1933.                C. W. RICE                1,923,506
                         SHADE ROLLER MOUNTING
                         Filed April 30, 1930
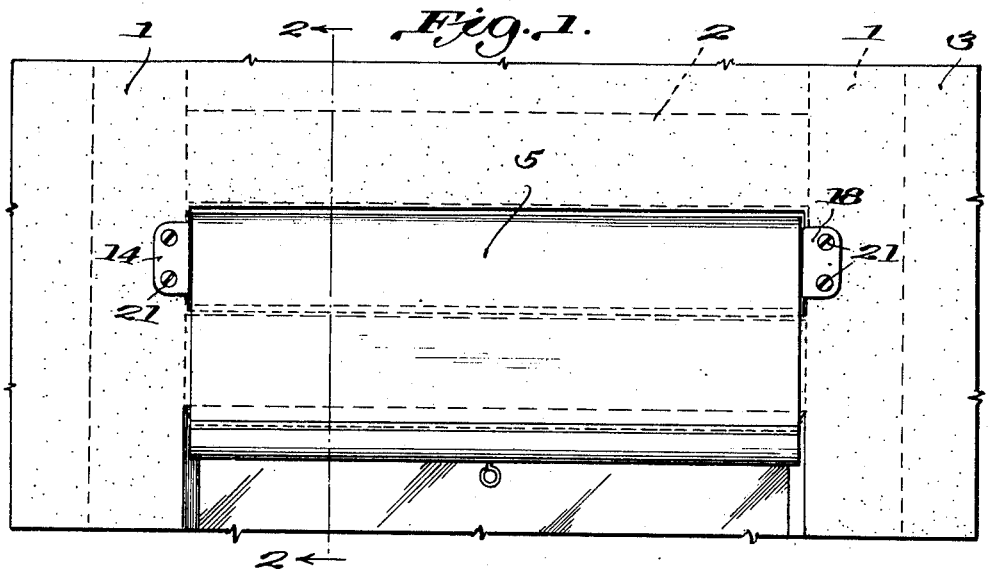
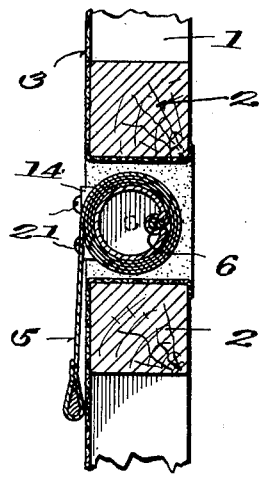
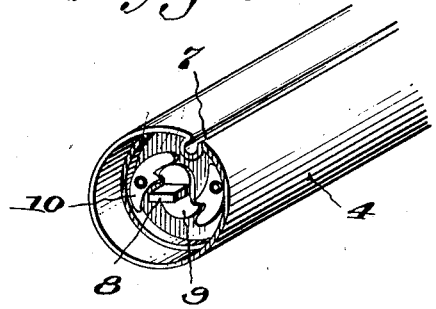
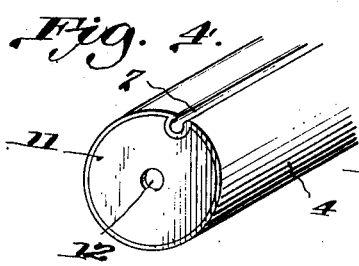
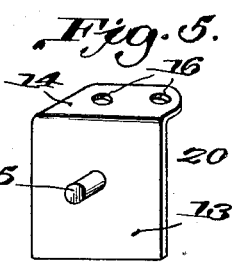
Inventor
Charles W. Rice
By Dyre & Kirchner
Attorneys Patented Aug. 22, 1933

1,923,506

UNITED STATES PATENT OFFICE 1,923,506

SHADE ROLLER MOUNTING

Charles Wesley Rice, Union City, Ind.

Application April 30, 1930. Serial No. 448,718

7 Claims. (Cl. 156—24)

My invention relates to window shades and mountings therefor, and more particularly to an improved assembly of a shade-carrying roller and a pair of brackets for positioning the roller in a neat and effective manner at a minimum of cost.

An especial object of the invention is to provide a combination of shade roller and brackets which will enable the roller to be mounted in a suitable recess in a wall or the like in such a way that the roller will be entirely contained within the wall and the shade itself, which may be unwound tangentially from the roller, will, when so unwound, lie flat against the wall or a window pane flush therewith.

A further object is to provide a shade roller mounting which will have the foregoing and other advantages, which will be capable of ready and easy assembling into operative position, and which may be constructed of inexpensive materials at a minimum of expense.

One typical use for which the subject of the present application for Letters Patent is well adapted is in connection with the windows or lights in the side or rear walls of an autmobile body, and the invention will be illustrated and explained herein in terms of its application to such use. It is to be understood, however, that structures made and assembled in accordance with the principles of this invention are equally well adapted to other and different uses, and the invention is therefore not to be considered limited to any particular application, or in any other respect, excepting only by the state of the art and as pointed out in the appended claims.

One embodiment of the invention is illustrated in the accompanying drawing which forms part of this application for Letters Patent and in which the same reference character designates the same part in the several views, and in which:

Figure 1 is a front elevation of the rear wall of an automobile body interior, showing a shade roller assembly constructed according to the principles of my present invention mounted above the window or light thereof;

Fig. 2 is a vertical section taken along the line 2—2 of Fig. 1;

Fig. 3 is a perspective view of one end of the shade roller showing the inset pintle for actuating the internal spring of the roller;

Fig. 4 is a perspective view of the opposite end of the shade roller showing the perforated element which receives the bracket pin;

Fig. 5 is a perspective view of the pin-carrying bracket which cooperates with the end of the roller shown in Fig. 4; and Fig. 6 is a perspective view of the perforated bracket which cooperates with the end of the roller shown in Fig. 3.

Referring now to the drawing, the reference numeral 1 indicates the vertical members of the frame structure of an automobile body, and 2 a pair of cross members which are conveniently spaced apart to provide a rectangular recess in the portion of the body wall just above the window or light in connection with which a shade is to be mounted. It is to be understood that the recess may be formed in the wall in any convenient manner, whether in the way just described, by rabbeting a wide cross piece of the frame, or otherwise. An upholstery fabric or the like 3 may be surfaced over the frame according to common practice, with the portions thereof at the margins of the frame members tucked into the recess, as shown in the drawing.

The shade roller comprises a tubular shell 4 to which one end of a shade 5 is secured by any suitable means. I prefer to employ a metal shell, and in this case the shade and shell are conveniently secured together by interengagement of a beaded edge 6 on the shade with a slot 7 in the periphery of the roller. Both the bead and the slot are substantially circular in section and the two are engaged by sliding the shade bead into the roller slot from one end thereof, as will be evident from the drawing.

The shell of the roller contains the coil spring (not shown) usual in spring-actuated shade rollers, one end of which is fastened in the shell and the other end of which is secured to a rotatable rectangular pintle 8 carrying a ratchet element 9 which coacts with a pair of pawls 10, according to common practice.

A novel feature of the roller which constitutes an element of the present invention is the location of this spring-actuating pintle 8, which is inset inwardly from the end of the roller shell 4, as best shown in Fig. 3, for a purpose which will presently appear.

The opposite end of the roller, shown in Fig. 4, carries a bearing element which may be a disk 11 flush with or inset from the end of the shell of the roller. A bearing aperture 12 is provided in the element 11 in alignment with the axis of the roller.

The brackets shown in Figs. 5 and 6 are intended to be associated with the roller ends of Figs. 4 and 3 respectively. The bracket of Fig. 5 consists conveniently of a sheet metal stamping or the like, having two portions 13 and 14 associated at an angle. The portion 13 carries a projecting pin 15 and the portion 14 is perforated as at 16 to receive screws or the like for securing the bracket in place upon a support. Similarly, the bracket of Fig. 6 may consist of two portions 17 and 18 associated at an angle, with perforations 16 in the portion 18. The bracket is provided with a tine or tongue 19 conveniently struck out of the metal of the portion 17 and extending parallel with the portion 18. This tongue has its free end bent into parallelism with the portion 17 and provided with an aperture 20 designed and adapted to fit snugly over the pintle 8.

To assemble the parts which have just been described, the brackets of Figs. 5 and 6 are fitted to their respective ends of the roller shell 4. It will be appreciated that the penetration of elements 15 and 19 into the shell of the roller will result in bringing portions 13 and 17 snugly up against the ends of the roller. The assembly of shade roller and brackets is then fitted into the recess formed by frame members 1 and 2 and secured therein by screws 21 or the like.

It will be evident that such assembly of the parts will result in making possible the use in a recess in a wall of a shade roller of substantially the same length as the recess, so that a snug and neat fit is assured. This effect may be enhanced somewhat by rabbeting the vertical members 1 to receive portions 17 and 13 of the brackets, as will readily be understood.

It is to be understood that the single embodiment of the invention which has been shown and described in this application for Letters Patent is merely by way of exemplification of the invention. The invention in its broader aspects is capable of embodiment in other and further modifications which will readily suggest themselves to persons skilled in the art, and all of such modifications, to the extent that they embody the principles of the invention as pointed out by the appended claims, are to be considered within the scope and purview thereof.

Having thus described my invention what I claim and desire to secure by Letters Patent is:

1. A window shade mounting for a wall having a recess formed therein comprising a shade roller adapted to be contained in the recess of a length substantially equal to the length of the recess and having a bearing surface at each end, each of said bearing surfaces being contained entirely inwardly of the planes of the opposite roller ends, in combination with a pair of brackets each having a portion extending into the recess at opposite ends thereof, a roller supporting element extending therefrom penetrating the plane of one end of the roller and engaged with the bearing surface thereof, whereby the face of each bracket from which the roller supporting element extends is brought into close proximity with the plane of the adjacent roller end, and each bracket having an angular portion adapted to be engaged with the surface of the wall and securable thereto.

2. A window shade mounting for a wall having a recess formed therein, comprising a shade roller adapted to be contained in the recess and having a bearing surface at each end, each of said bearing surfaces being contained entirely inwardly of the planes of the opposite roller ends, in combination with a pair of brackets, each bracket comprising a portion engaged with the front face of the wall and an angularly extending portion having one surface engaged with one of the pair of oppositely disposed parallel surfaces in the wall at the ends of the recess and its opposite surface positioned close to the plane of one of the roller ends, and a roller supporting element extending from the last-mentioned surface of each bracket penetrating the plane of one of the roller ends and supporting the bracket engaging surface thereof.

3. A window shade assembly adapted to fit in a recess, formed in a wall including a shade carrying roller shell of a length substantially equal to the length of the recess, a bracket engaging element carried by each end of the roller shell and spaced inwardly from the plane of each of said ends, in combination with a pair of brackets each provided with a portion having a surface engaged with one of the parallel surfaces formed in the wall at opposite ends of the recess and at substantially right angles to the front surface of the wall and each having a roller shell supporting element penetrating the plane of one end of the roller shell and supporting the bracket-engaging element thereof, said wall engaging surface of each bracket being closely adjacent to the plane of one end of the roller shell, each bracket being provided with an angular portion engaged with the front surface of the wall and secured thereto.

4. A window shade assembly adapted to fit in a recess formed in a wall including a shade carrying roller shell of a length substantially equal to the length of the recess having a spring actuating pintle positioned inwardly from one end thereof, an apertured plug secured in the other end of the roller, in combination with a bracket provided with a portion extending into the recess and having a surface engaged with one of the parallel surfaces formed in the wall at opposite ends of the recess and having a tongue extending therefrom provided with an aperture projecting into the roller shell and receiving the pintle, and another bracket provided with a portion extending into the recess and having a surface engaged with the surface formed in the wall at the opposite end of the recess parallel to said first-mentioned wall surface and having a bearing pin extending therefrom into the aperture in the plug, said wall engaging surface of each bracket being closely adjacent to the plane of one end of the roller shell, and each of said brackets having an angular portion engaged with the front surface of the wall and secured thereto.

5. A bracket for mounting a spring actuated window shade roller in a recess formed in a wall including a portion adapted to be secured to the surface of the wall and another portion extending at an angle from the first portion adapted to be contained in the recess and provided with an integral, angularly extending tongue having a polygonal aperture for penetrating one end of a shade roller and receiving and holding against rotation the spring winding pintle thereof.

6. A bracket as claimed in claim 5 in which the free end portion of the tongue is bent right-angularly and the polygonal aperture is provided in said free end portion.

7. A bracket for mounting a spring actuated window shade roller in a recess in a wall, said bracket being formed of a single piece of metal and including a portion adapted to enter the recess, spaced apart portions extending oppositely and right-angularly from said first portion, one of said second portions being adapted to be secured to the surface of the wall outside of the recess and the other being adapted to extend into an end of a shade roller, said latter portion having its end bent right-angularly and provided with a rectangular aperture for receiving and holding against rotation the spring winding pintle of the roller.

CHAS. WESLEY RICE.